INVENTOR
PETER HAROLD SMITH
BY PENDLETON, NEUMAN
SEIBOLD & WILLIAMS
ATTORNEY

INVENTOR
PETER HAROLD SMITH
BY PENDLETON NEUMAN
SEIBOLD & WILLIAMS
ATTORNEY

# 3,541,289
CONVEYOR TYPE HEATING
Peter Harold Smith, London, England, assignor to Microtherm Limited
Filed Dec. 11, 1967, Ser. No. 689,489
Claims priority, application Great Britain, Dec. 9, 1966, 55,345/66
Int. Cl. H05b 5/00, 1/02, 9/00
U.S. Cl. 219—10.69                                      11 Claims

ABSTRACT OF THE DISCLOSURE

The disclosure relates to an oven in which articles are passed on a conveyor through a heating compartment where the articles are exposed to microwave radiation. The articles are counted as they enter and leave the heating compartment and either, or both, of the power of the radiation and the speed of the conveyor is controlled as a function of the number of articles between the counting points. Another oven disclosed is intended for heating bulk material, and the power of the radiation is controlled as a function of the movement of the conveyor.

---

This invention relates to conveyor type heating apparatus, that is to say heating apparatus where material to be heated is transported through a heating compartment by a conveyor arrangement.

It is particularly convenient to use radio frequency electromagnetic radiation to provide heating energy, and apparatus of this kind can operate satisfactorily where the electromagnetic load presented to the radiation in use is substantially constant. However in some circumstances the load presented to the radition may vary, and the present invention is concerned with apparatus suitable for such use.

The present invention provides heating apparatus of this kind in which at least one variable related to the heating energy absorbed by the material in passing through the heating compartment, such as the speed of the conveyor, or the power of the radiation, is controlled as a function of a variable which is related to the aggregate amount of the material in the heating compartment.

Features and advantages of the invention will appear from the following description of an embodiment thereof, given by way of example in conjunction with the accompanying drawings, in which.

Figure 1:
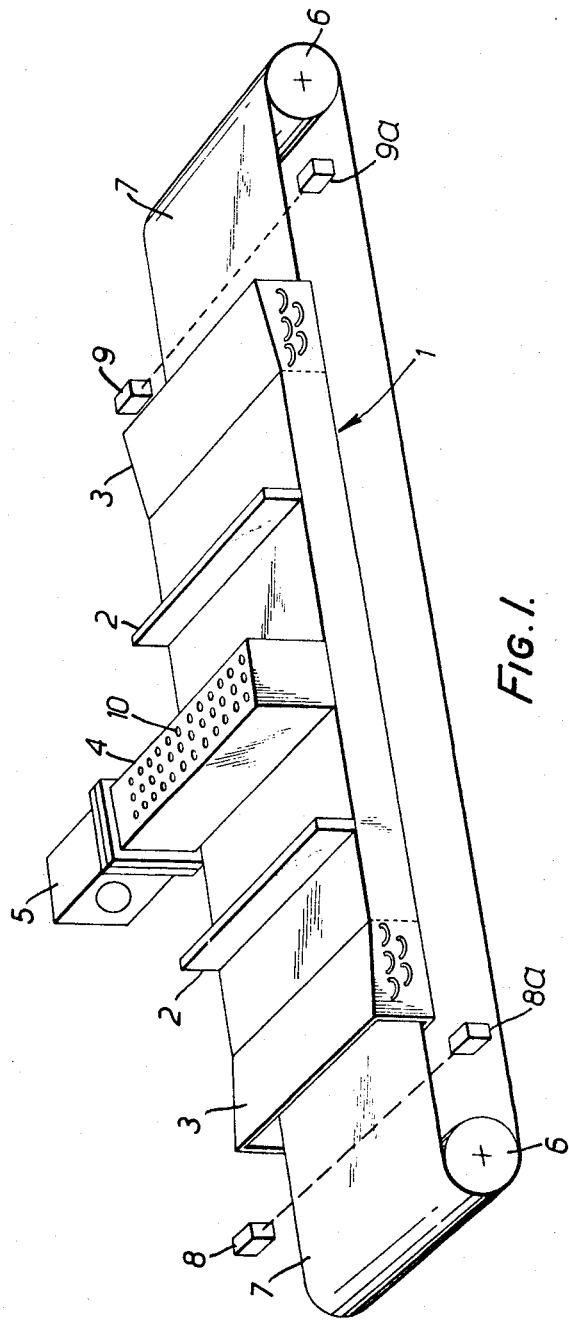
FIG. 1 is a schematic perspective view of a conveyor type microwave oven.

The apparatus shown in the drawings is intended for heating a succession of articles. The articles can be placed at variable intervals on a conveyor, which passes the articles through a heating compartment, where the articles are exposed to microwave electromagnetic radiation. A number of the articles may be within the heating compartment simultaneously, and this number is a function of the intervals between the articles on the conveyor. Two sensors are disposed respectively before and after the heating compartment and respond to the passage of individual articles past the sensors. A counting device is connected to count the numbers of articles passing the respective sensors in opposite senses, so that the total registered by the counter is a function of the number of articles between the sensors at any given moment. Either one, or both, of the power of the radiation and speed of the conveyor is controlled as a function of the total registered by the counter, so that the heating energy absorbed by each article in passing through the heating compartment is substantially independent of the number of articles in the heating compartment.

In more detail, the heating compartment is defined by a tunnel 1 at the entrance and exit of which, to attenuate and absorb microwave radiation from the ends of the tunnel, are provided box-section chokes 2 and tubes of low-loss dielectric material which receive a flow of cooling water in operation, the tubes being arrayed in tapered waveguide sections 3 which define the entrance and exit apertures for the articles to be heated. Microwave energy from a source such as a magnetron (not shown) is fed into the tunnel 1 by a launching waveguide section 4 coupled to an input waveguide 5. The launching section 4 extends transverse to the length of the conveyor, and is coupled to the tunnel 1 by a number of radiation slots (not shown) in a common wall between the waveguide and the tunnel. The launching waveguide 4 could be branched with arms extending above and below the tunnel 1 generally in the manner disclosed in British Pat. No. 977,777. Perforations 10 are provided in an external wall of the launching section 4 to enable vapours produced in heating to be withdrawn from the tunnel and the waveguide sections by a fan (not shown); the dimensions of the perforations are sufficiently small to prevent significant emission of microwave radiation.

Articles to be heated are transported through the heating compartment by a conveyor belt 7 of low loss dielectric material which runs on rollers such as 6. As each article enters the entrance and exit sections 3 of the heating compartment, it interrupts respectively the light from a source 8 projected onto a photo-electric device 8a, and the light from a source 9 falling on a photo-electric device 9a.

Figure 2:
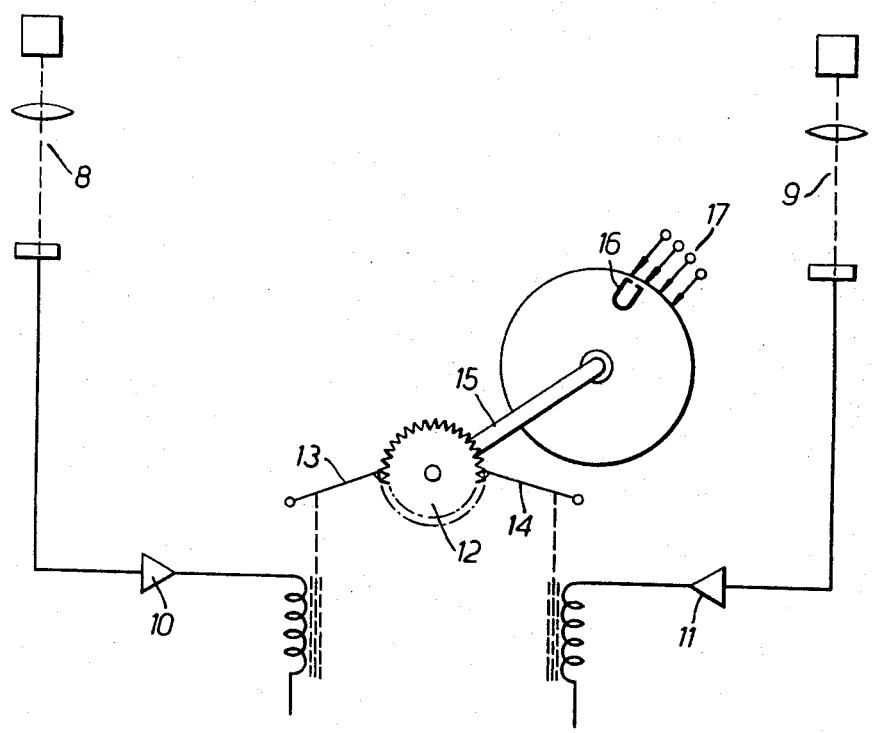
FIG. 2 is a schematic diagram of a sensor arrangement used in the control circuits of the oven.

Referring now to FIG. 2, the photo-electric devices 8a and 9a are connected respectively through amplifiers 10 and 11 to the advance and retard solenoids of a reversible stepping switch 12. When the light falling on the cell 8a is interrupted, the advance solenoid is energised to displace a ratchet arm 13, which rotates a shaft 15 by one step in one sense. Similarly when the light falling on the photocell 9a is interrupted, the retard solenoid displaces a ratchet arm 14 to rotate the shaft 15 one step in the opposite sense. A bank of stator contacts 17 are associated with a contact 16 which rotates with the shaft 15. The shaft 15 conveniently has fifty steps of rotation.

Figure 3:
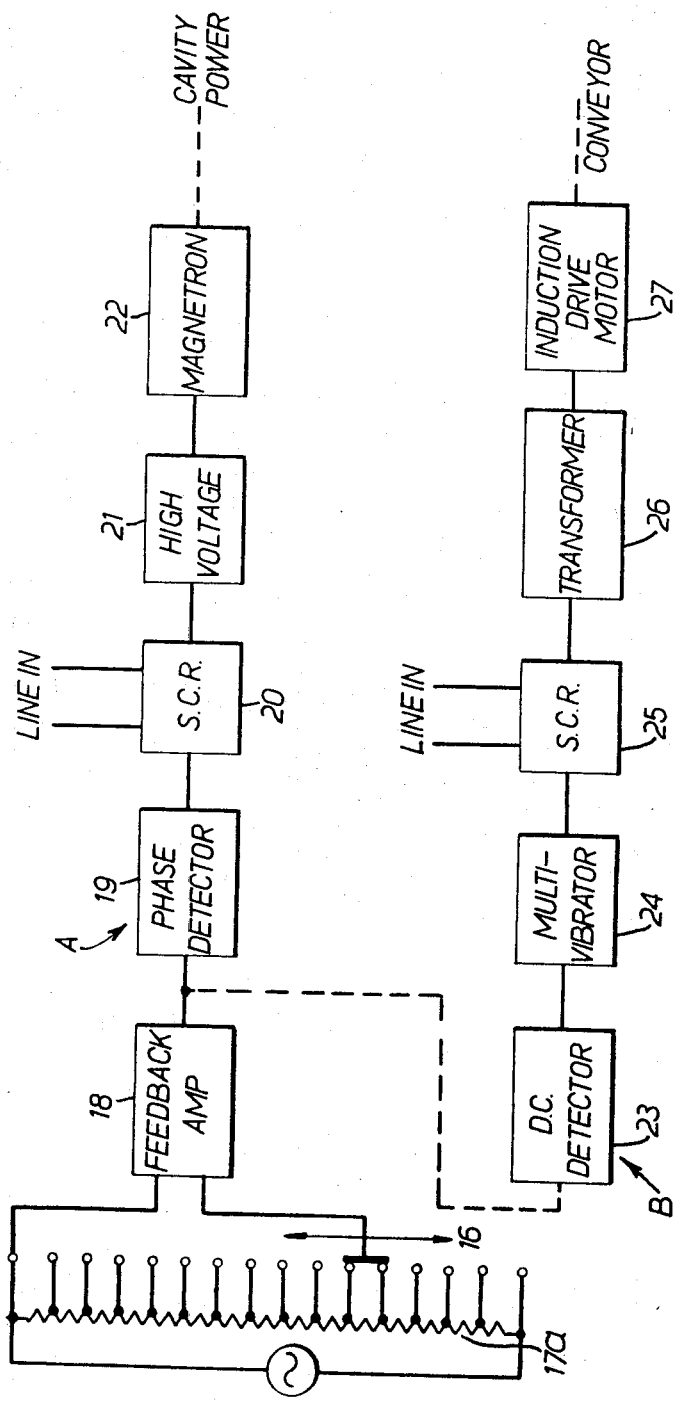
FIG. 3 is a block diagram of a control circuit of the oven.

Referring next to FIG. 3, the contacts 17 are connected to respective taps on a potentiometer 17a to which an alternating voltage is applied. The voltage developed at the rotating contact 16 is applied through a buffer amplifier 18 to one or both of two control circuits A and B. The control circuit A comprises a phase detector circuit 19 which generates pulses when the signal from the buffer amplifier 18 reaches a predetermined level, and the pulses accordingly vary in phase with the amplitude of the voltage on the rotating contact 16. The pulses from the phase detector 19 are used as the firing pulses for semi-conductor rectifiers of a chopper circuit 20 which is fed with direct current, the output of the chopper circuit being a pulse signal of variable mark to space ratio. The high voltage signal from the chopper circuit is smoothed by a filter circuit 21, and provides the anode voltage for the magnetron 22. By appropriate choice of the characteristics of the circuit, it is arranged that the power of the electromagnetic energy generated by the magnetron 22 is proportional to the number of articles between the sensors 8, 8a, and 9, 9a, as indicated by the stepping switch.

The control circuit B comprises a detector circuit 23 whose output is a DC signal of amplitude proportional to the amplitude of the voltage on the rotating contact 16, this signal being used to control the frequency of oscillation of a multivibrator 24. The output of the multivibrator, after differentiation, provides the firing pulses for semiconductor rectifiers of an inverter circuit 25, the output of which is passed through a transformer 26 to an induction motor 27 which drives the conveyor belt 7. The characteristics of this control circuit are chosen so that the speed of the conveyor is inversely proportional to the number of articles between the sensors 8, 8a, and 9, 9a, as indicated by the stepping switch, and the time the articles spend in the heating compartment accordingly depends on the number of articles between the sensors.

The apparatus is particularly suitable for heating articles of food such as plates of refrigerated precooked meals. The apparatus may be installed in a restaurant and will automatically adjust the heating of the articles in relation to different spacings between the articles placed on the conveyor 7. Thus, with no articles on the conveyor, the magnetron 22 is completely cut off (if circuit B alone is used by a switch device which is not shown) and at peak serving time, the oven is used at its maximum capacity, at the appropriate microwave power level and conveyor speed, or both these variables, automatically establish for all intermediate levels.

Provision can be made for modifying manually the characteristics of the control circuit to accommodate articles having different electromagnetic characteristics. For example the conveyor belt may be arranged to move at a slower speed when entrees are being heated than when soups or puddings are being heated. The manual control may be effected by changing the potentiometer 17a, and conveniently a number of different potentiometers can be mounted on respective card holders which can be plugged into a multicontact socket (not shown) connected to the stepping switch to select the appropriate characteristics for the control circuits.

The apparatus can also be adapted for use with bulk materials which are transported continuously along the conveyor, instead of intermittently transported articles as discussed above. If the mass of such bulk material exposed to the microwave radiation is a function of the movement of the conveyor, then the power supplied by the magnetron is controlled by the movement of the conveyor; and this can conveniently be done by the control circuit A in FIG. 3 if the stepping switch is controlled by the movement of driven roller of the conveyor through suitable clutch and gearing arrangements.

We claim:

1. Heating apparatus including a heating compartment, a source for supplying radio frequency electromagnetic radiation to said heating compartment, conveyor means for passing material through said heating compartment for heating by said radiation, sensing means senstive to a first variable which is proportional to the aggregate amount of said material in said heating compartment and insensitive to the electrical characteristics of such material, and control means responsive to said sensing means for controlling at least one second variable which is related to the total heating energy absorbed by said material in passing through said heating compartment.

2. Heating apparatus including a heating compartment, a source for supplying radio frequency electromagnetic radiation to said heating compartment, conveyor means for passing material through said heating compartment for heating by said radiation, sensing means sensitive to a first variable which is related to the aggregate amount of said material in said heating compartment, and control means responsive to said sensing means for controlling at least one second variable which is related to the total heating energy absorbed by said material in passing through said heating compartment, said control means including means for controlling the power of said radiation.

3. Heating apparatus according to claim 2 wherein said source includes a valve having an anode and a cathode, and bias means for applying a direct bias voltage between said anode and said cathode, the power of said radiation being a function of said bias voltage, and wherein said control means includes means for controlling said bias voltage, whereby to control the power of said radiation.

4. Heating apparatus according to claim 3 wherein said sensing means generates an alternating signal whose amplitude is a function of said first variable, and wherein said control means includes phase responsive means for generating a train of pulses whose relative to said alternating signal is a function of said amplitude of said alternating signal, and converter means for generating said bias voltage, said converter means being connected to said phase responsive means so that the amplitude of said bias voltage is a function of said phase.

5. Heating apparatus according to claim 1 wherein said control means controls the speed of said conveyor means.

6. Heating apparatus including a heating compartment, a source for supplying radio frequency electromagnetic radiation to said heating compartment, conveyor means for passing material through said heating compartment for heating by said radiation, sensing means sensitive to a first variable which is related to the aggregate amount of said material in said heating compartment, and control means responsive to said sensing means for controlling at least one second variable which is related to the total energy absorbed by said material in passing through said heating compartment, said control means controlling the speed of said conveyor means, and said sensing means including generator means for generating a direct signal whose amplitude is a function of said first variable, wherein said conveyor means includes a prime mover responsive to an alternating signal for driving the conveyor means, the speed of said conveyor means being a function of the frequency of said alternating signal, and said control means including means connected to said generator means for generating said alternating signal, the frequency of said alternating signal being a fuction of said amplitude of said direct signal.

7. Heating apparatus for heating a succession of separate articles, including a heating compartment, a source for supplying radio frequency electromagnetic radiation to said heating compartment, conveyor means for passing material through said heating compartment for heating by said radiation, sensing means sensitive to a first variable which is related to the aggregate amount of said material in said heating compartment, and control means responsive to said sensing means for controlling at least one second variable which is related to the total heating energy absorbed by said material in passing through said heating compartment, said sensing means including an entrance sensor mounted adjacent an entrance point for said coveyor in said heating compartment, an exit sensor mounted adjacent an exit point for said conveyor in said heating compartment, said sensors being sensitive to the passage of articles towards and away from said heating compartment, and counting means connected to said sensors for counting in opposite senses the passage of the articles passed the respective sensors.

8. Heating apparatus according to claim 7 wherein said counting means includes a potentiometer having a tapping point and a stepping switch responsive to pulses from said sensors for changing said tapping point.

9. Apparatus according to claim 1 and including absorption means disposed at entrance and exit points of said conveyor means in said heating compartment for absorbing said radiation.

10. Apparatus according to claim 2 for heating bulk material, wherein said sensing means senses the movement of said conveyor means.

11. Heating apparatus including a heating compartment, a source for supplying radio frequency electromagnetic radiation to said heating compartment, conveyor means for passing material through said heating compartment for heating by said radiation, sensing means sensitive to a first variable which is related to the aggregate amount of said material in said heating compartment, control means responsive to said sensing means for controlling at least one second variable which is related to the heating energy absorbed by said material in passing through said heating compartment, said sensing means including an entrance sensor mounted adjacent a entrance point for such conveyor in said heating compartment, an exit sensor mounted adjacent an exit point for said conveyor in said heating compartment, said sensors being sensitive to the passage of articles towards and away from said heating compartment, counting means connected to said sensors for counting in opposite senses the passage of the articles past the respective sensors, and absorption means disposed at said entrance and exit points for absorbing said radiation, said absorption means being interposed between said sensors and said heating compartment.

References Cited

UNITED STATES PATENTS

| | | | |
|---|---|---|---|
| 3,277,580 | 10/1966 | Tooby | 219—10.55 |
| 3,335,253 | 8/1967 | Jeppson et al. | 219—10.55 |
| 2,603,741 | 7/1952 | Sufired et al. | 219—10.69 X |
| 2,632,091 | 3/1953 | Hagopian | 219—10.69 |
| 2,647,983 | 8/1953 | Boyd | 219—10.77 |
| 2,681,975 | 6/1954 | Leonard | 219—10.69 |
| 2,829,229 | 4/1958 | Metz | 219—10.77 X |
| 2,998,501 | 8/1961 | Edberg et al. | 219—10.69 X |
| 3,365,562 | 1/1968 | Jeppson | 219—10.69 X |
| 3,422,239 | 1/1969 | Ojelid | 219—10.55 |

JOSEPH V. TRUHE, Primary Examiner

L. H. BENDER, Assistant Examiner

U.S. Cl. X.R.

219—10.77, 10.55

PO-1050
(5/69)

UNITED STATES PATENT OFFICE
CERTIFICATE OF CORRECTION

Patent No. 3,541,289     Dated November 17, 1970

Inventor(s)    Peter Harold Smith

It is certified that error appears in the above-identified patent and that said Letters Patent are hereby corrected as shown below:

Column 4, line 40, change "fuction" to -- function -- line 54, change "coveyor" to -- conveyor --

Column 5, line 9, change "a" to -- an -- line 10, change "such" to -- said --

Column 6, line 5, change "Sufired" to -- Seifried --

SIGNED AND
SEALED
FEB 9 1971

(SEAL)
Attest:

Edward M. Fletcher, Jr.
Attesting Officer

WILLIAM E. SCHUYLER, J
Commissioner of Patent